United States Patent [19]
Rutherford

[11] Patent Number: 4,842,761
[45] Date of Patent: Jun. 27, 1989

[54] COMPOSITIONS AND METHODS FOR CONTROLLED RELEASE OF FRAGRANCE-BEARING SUBSTANCES

[75] Inventor: Howard J. Rutherford, Highlands, N.J.

[73] Assignee: International Flavors & Fragrances, Inc., New York, N.Y.

[21] Appl. No.: 172,089

[22] Filed: Mar. 23, 1988

[51] Int. Cl.[4] .......................... C11D 3/50; C11D 3/37; C08J 9/12

[52] U.S. Cl. .......................................... 252/90; 422/5; 424/76.4; 424/485; 424/486; 424/488; 428/407; 428/905; 428/913; 512/4; 523/102; 206/524.6; 252/174.11; 252/174.23

[58] Field of Search ...................... 252/8.6, 174.11, 90; 422/5; 424/485, 486, 488, 76.4; 428/402.24, 407, 905, 913; 512/4; 523/102; 525/122, 936; 206/524.6

[56] References Cited

U.S. PATENT DOCUMENTS

| | | | |
|---|---|---|---|
| 2,577,921 | 3/1949 | Samel et al. . | |
| 3,472,840 | 10/1969 | Stone et al. . | |
| 3,553,296 | 1/1971 | Gaeckel | 428/905 |
| 3,576,760 | 4/1971 | Gould et al. | 252/403 |
| 3,909,444 | 9/1975 | Anderson et al. | 428/402.24 |
| 3,992,336 | 11/1976 | Faucher et al. . | |
| 4,018,729 | 4/1977 | Faucher et al. . | |
| 4,042,529 | 8/1977 | Nimerick et al. | 428/407 |
| 4,136,250 | 1/1979 | Mueller et al. . | |
| 4,145,184 | 3/1979 | Brain et al. | 8/137 |
| 4,209,417 | 6/1980 | Whyte | 252/174.11 |
| 4,339,356 | 7/1982 | Whyte . | |
| 4,348,293 | 9/1982 | Clarke et al. | 252/90 |
| 4,356,115 | 10/1982 | Shibanai et al. | 512/4 |
| 4,407,231 | 10/1983 | Colborn et al. . | |
| 4,423,099 | 12/1983 | Mueller et al. | 428/35 |
| 4,436,644 | 3/1984 | Johnson . | |
| 4,471,717 | 9/1984 | Lander . | |
| 4,498,996 | 2/1985 | Klemarczyk | 252/8.6 |
| 4,548,764 | 10/1985 | Munteanu et al. . | |
| 4,618,629 | 10/1986 | Buchanan . | |
| 4,657,693 | 4/1987 | Wise et al. . | |
| 4,668,434 | 5/1987 | Bowman . | |
| 4,719,040 | 1/1988 | Traas et al. . | |
| 4,722,865 | 2/1988 | Huizer | 428/407 |

FOREIGN PATENT DOCUMENTS

| | | |
|---|---|---|
| 0231826 | 8/1987 | European Pat. Off. . |
| 10848 | 2/1975 | Japan . |
| 158724 | 7/1987 | Japan . |

*Primary Examiner*—Prince E. Willis
*Attorney, Agent, or Firm*—Brooks Haidt Haffner & Delahunty

[57] ABSTRACT

Laundering compositions containing particulate olfactory polymers which provide for the controlled release of olfactory compositions such as perfumes, the particulate olfactory polymers comprising a water-soluble normally solid polymer, a water-insoluble normally solid polymer, and at least one olfactory composition which is in each polymer, one polymer being in the form of discrete entitles in a matrix of the other polymer, together with laundering articles such as packets containing such compositions; methods for laundering using such compositions; the particulate olfactory polymers; and methods for preparing the particulate olfactory polymers.

19 Claims, 9 Drawing Sheets

FIG. 1A
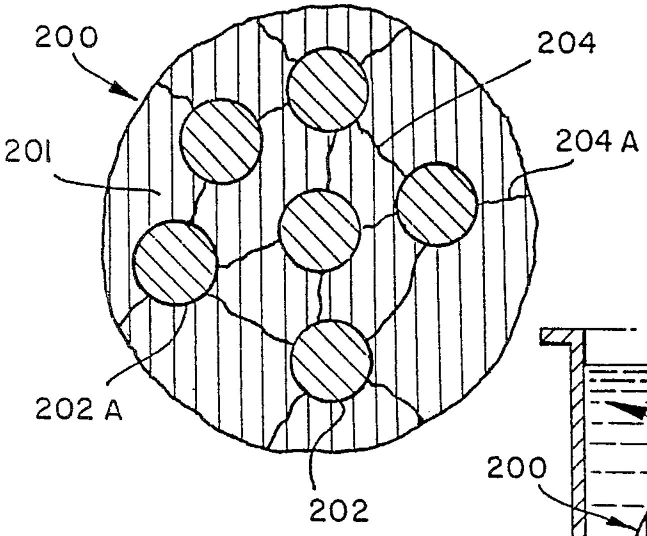
FIG. 1B
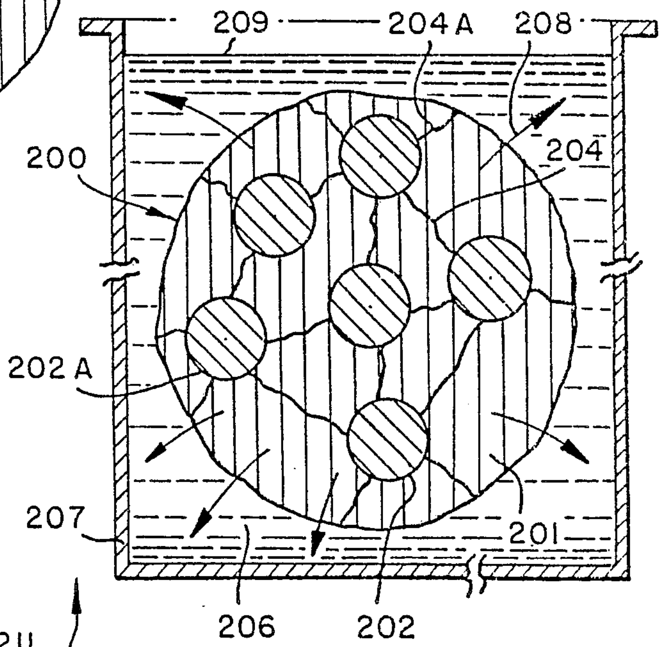
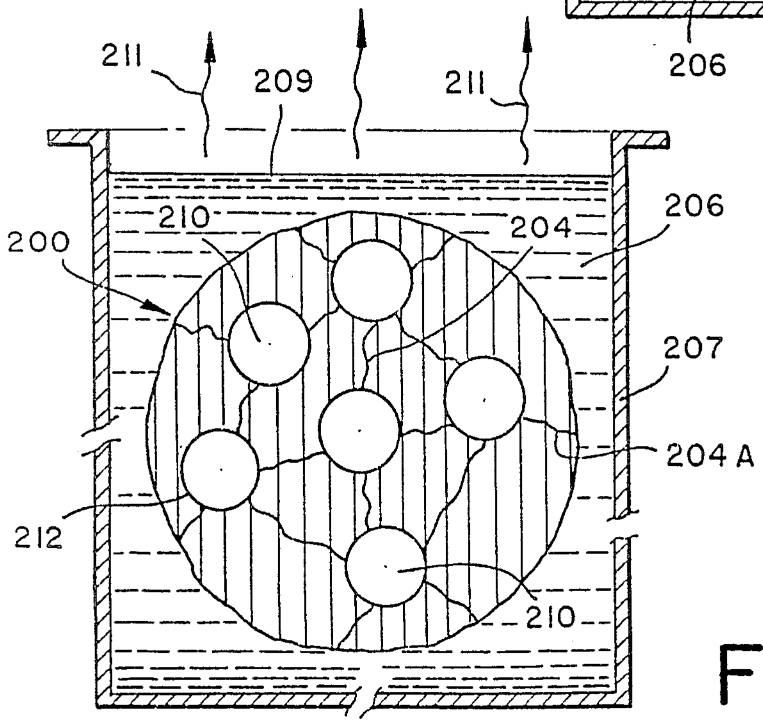
FIG. 1C

FIG. 1D
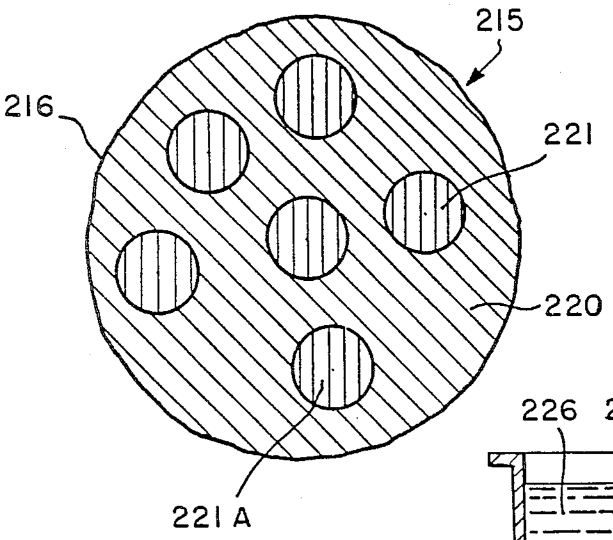
FIG. 1E
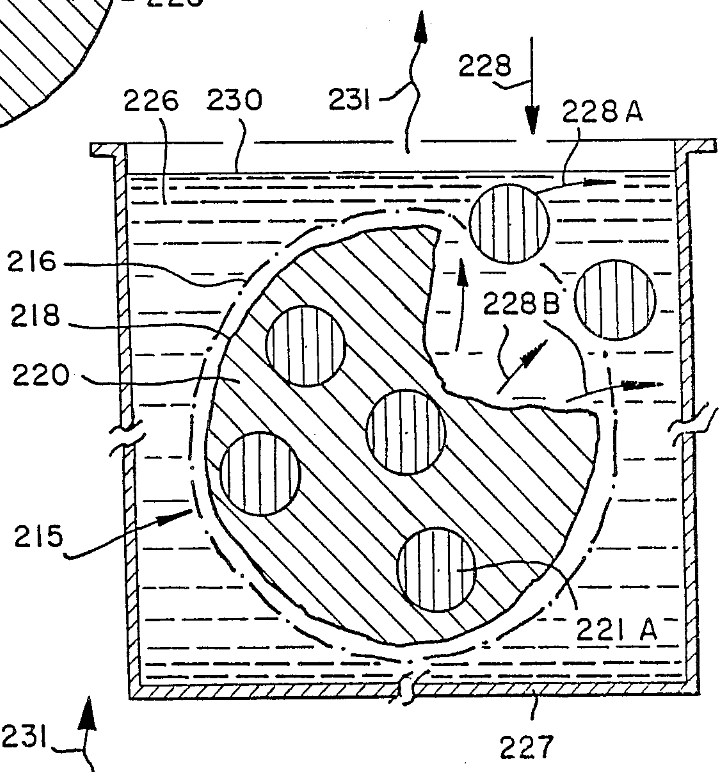
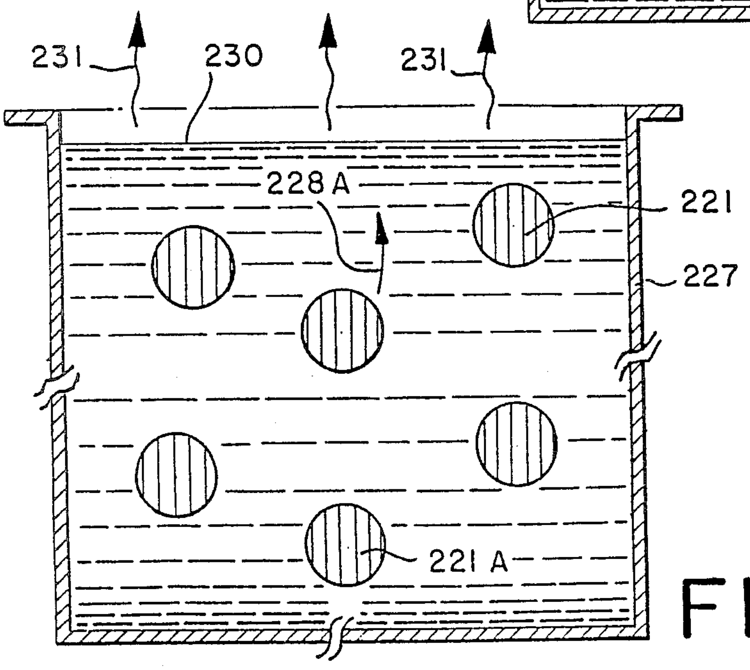
FIG. 1F

FIG. 2A
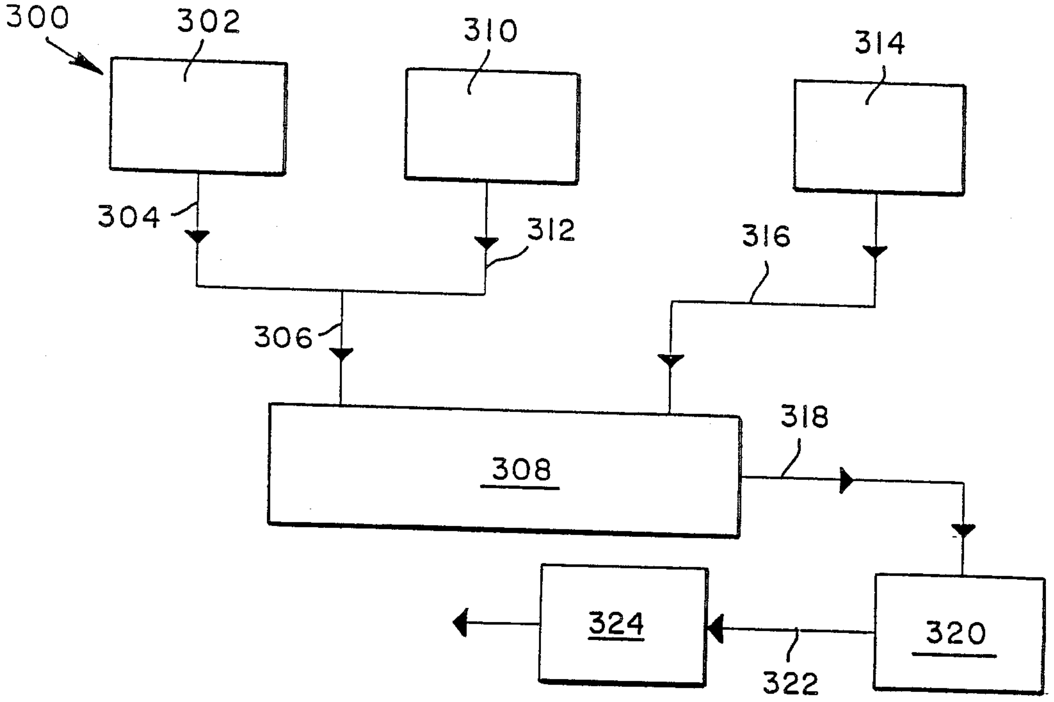
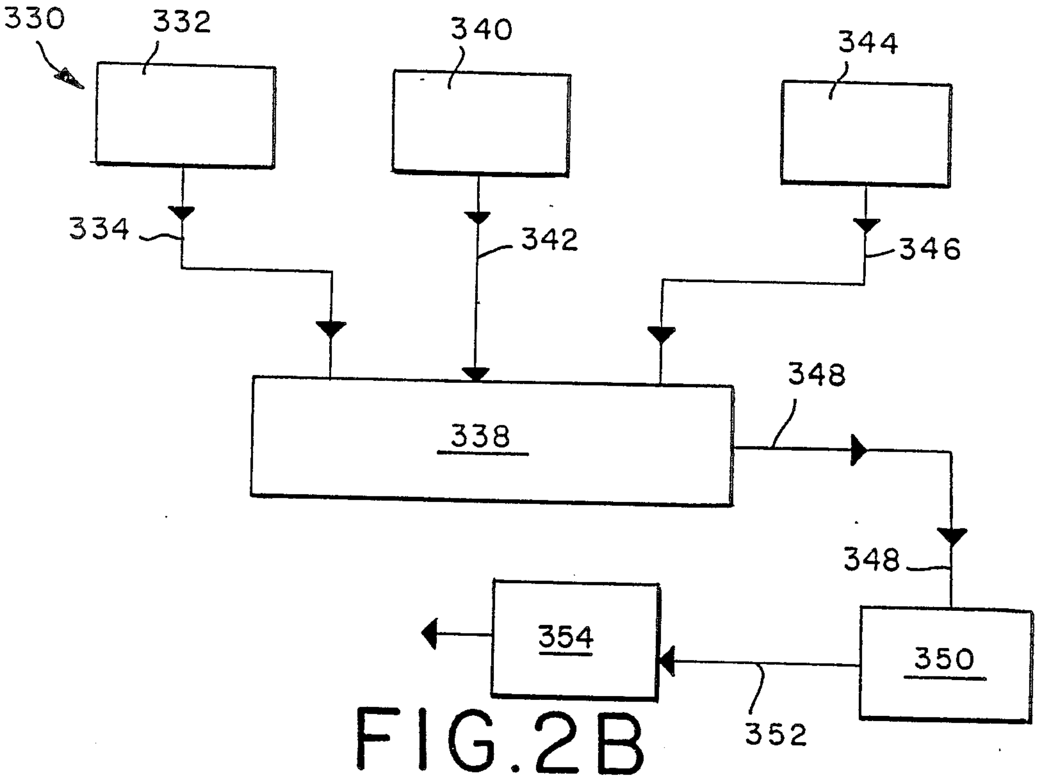
FIG. 2B

FIG.2C
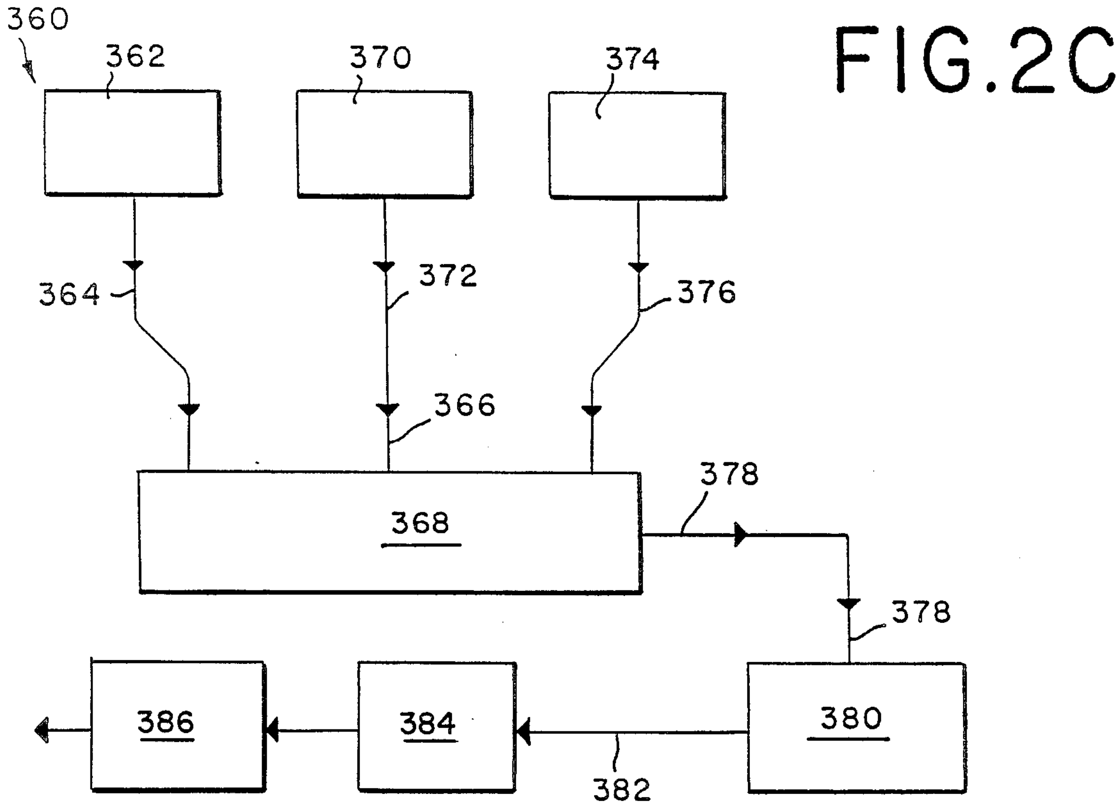
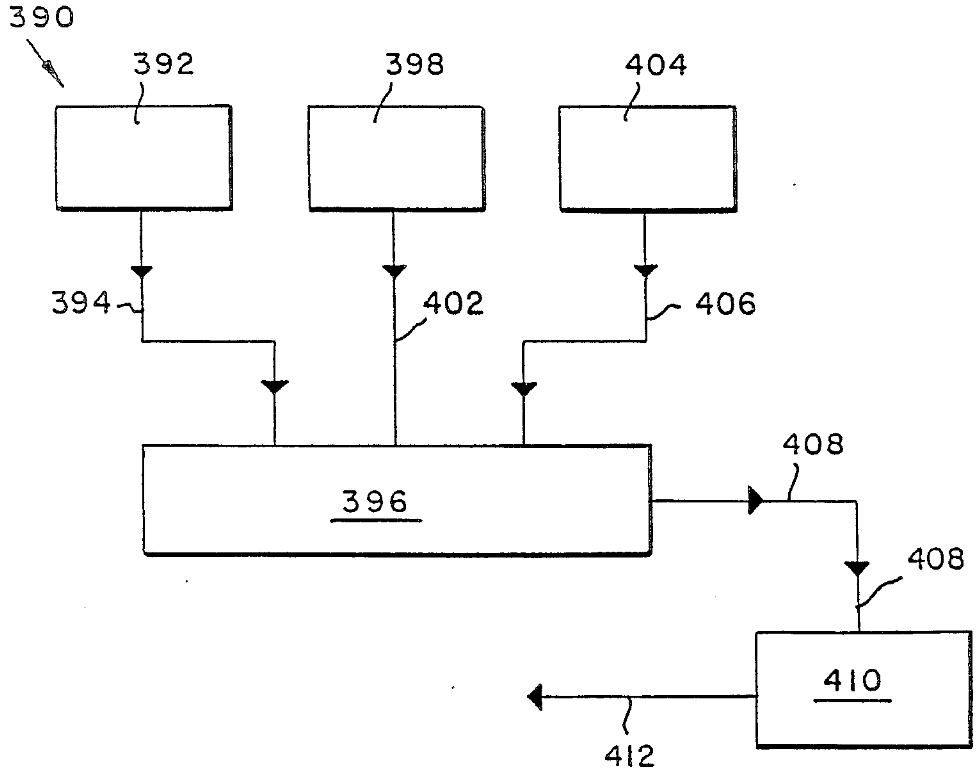
FIG.2D

COMPOSITIONS AND METHODS FOR CONTROLLED RELEASE OF FRAGRANCE-BEARING SUBSTANCES

BACKGROUND OF THE INVENTION

The present invention relates to methods for sequentially releasing olfactory compositions into the atmosphere under preselected conditions, and more particularly, it relates to methods for releasing fine chemicals such as perfumes during the course of a multi-stage operation, such as the laundering and drying of textiles, together with novel compositions adapted to such purposes and processes for preparing such compositions.

The current state of the art for perfuming and/or deodorizing detergent compositions, fabric softener compositions, fabric softener articles and hair preparations generally involves mixing or emulsification of the perfume composition with a detergent, fabric softener, or other composition to be perfumed, or the surface application, as by spraying of the perfume composition onto a solid, without any means for effecting a controlled release of the perfume compositions over a period of time into the atmosphere around the article or composition containing the perfume. In instances where controlled release of the perfume is attempted, as with detergent compositions, the release of the perfume is too slow, and the resultant aroma is much too weak to be perceived, or the perfume composition is released too rapidly and is used up so that its effect is undesirably ephemeral.

Shaped articles for controlling the release of a functional material are shown in Faucher et al U.S. Pat. Nos. 3,992,336 and 4,018,729 which describe the preparation of articles for conditioning hair by blending water-soluble polymers with water-insoluble polymers to form interpenetrating networks so that the water-soluble polymer can be extracted from the article when wet or when brought in contact with wet hair.

Wise et al U.S. Pat. No. 4,657,693 shows a spray-dried granular detergent composition comprising a non-soap ionic detergent surfactant; an alkali metal tripolyphosphate detergent builder; and a mixture of a polyethylene glycol and a polyacrylate, the mixture having a polyethylene glycol:polyacrylate weight ratio of 1:10 to 10:1. This patent states that other ingredients commonly used in detergent compositions, such as bleaching agents, suds boosters, soil suspending agents, dyes, fillers, optical brighteners, germicides, enzymes, perfumes and water, can also be included. Buchanan U.S. Pat. No. 4,618,629 shows polyurethane foams containing a particulate resin carrying a fragrance which will be released over an extended period of time, but multiphase perfume-containing polymer compositions are not disclosed.

U.S Pat. No. 4,339,356 shows heavily perfumed particles prepared by emulsifying perfume in a water solution of water-soluble polymer and mixing with a hydratable material to provide a granular material which can be mixed into a detergent composition. U.S. Pat. No. 4,209,417 shows perfumed particles containing water-insoluble perfume and water-soluble polymer for use in detergent compositions. U.S. Pat. No. 4,668,434 shows compositions for the slow release of fragrances, repellants, and insecticides which compositions include a fragrance in a water-soluble polymer such as a vinyl copolymer.

U.S. Pat. No. 3,576,760 shows fragrances entrapped in water-soluble hydroxyethyl acrylate or methacrylate polymers. U.S. Pat. No. 4,136,250 shows water-insoluble gel of hydrophilic monoolefinic polymer or cross-linked copolymer for use as carriers. U.S. Pat. No. 4,548,764 shows e-caprolactone polymers used to release perfumes, pheromones, insect repellents, and animal repellents from solidified pellets made by extrusion.

U.S. Pat. No. 2,577,921 shows a comb with water-soluble methyl cellulose containing hair-treating agent. U.S. Pat. No. 4,436,644 prepares phosphate particles which can absorb surfactant or liquids such as perfumes. U.S. Pat. No. 3,472,840 shows quaternary nitrogen-containing cellulose ethers useful as anti-static agents and substantive to substrates such as paper and coal dust.

U.S. Pat. No. 4,471,717 provides animal litter of hydrophobic material which is granular material coated with hydrophobic substance and provided with top coating of non-water wettable material, which granular material can contain a distasteful organoleptic agent. U.S. Pat. No. 4,407,231 shows animal litter with microcapsules filled with fragrance or deodorizer fixed to particles of absorbent material. U.S. Pat. No. 4,018,729 shows polyurethane foams with particulate resin carrying a fragrance, for air fresheners.

U.S. Pat. No. 4,668,434 shows compositions for the slow release of fragrances, repellants, and insecticides which compositions include a fragrance in a water-soluble polymer such as a vinyl copolymer. U.S. Pat. No. 4,719,040 shows air freshener gels prepared from a premix of finely divided porous water-insoluble polymer and perfume with an aqueous gel-forming components comprising a gelling agent and water. European Patent Application No. 0 231 826 shows compressed tablets from which theophylline is released containing 43–50 percent theophylline, 10–20 percent water insoluble polymer, and 5–15 percent acid insoluble polymer, so that the capsule swells and slowly erodes. Various carboxylic acid polymers are used as the acid-insoluble polymers. Japanese Application No. 87-158724 shows placing unmelted plastic powders coated on the surface of melted plastic particles, which latter contain active ingredients such as perfumes. The particles are prepared by radio-frequency heating.

THE INVENTION

Briefly, the present invention provides methods for releasing olfactory compositions such as perfumes during the course of laundering and drying clothing and other textiles. The method comprises adding to the wash water in conjunction with the detergents and other ingredients the novel compositions of this invention in an appropriate package, releasing a portion of the perfume under the action of the wash water, optionally releasing another portion of the perfume during the rinse cycle, releasing a portion of the perfume during drying of the textiles, and optionally substantively depositing perfume on the textiles during the drying.

The novel compositions include multiple phase polymer particles comprising a normally solid water-soluble polymer and a normally solid water-insoluble polymer, the solid polymers each containing an olfactory composition such as a perfume, the watersoluble and water-insoluble polymers being in the form of a matrix such that one of the polymers is dispersed in a matrix of the other polymer with an intercommunicating structure such that a substantial amount of each polymer can communicate with the exterior of the particle. Generally, these particles permit the penetration of a surrounding liquid into the particle. Thus, in some of the particulate olfactory polymers of this invention, the two polymers are physically associated with each other such that one is in the form of substantially discrete entities in a matrix of the other and having a pore structure such that a proportion of the water-soluble entities communicate with one another and at least some of the entities communicate with the exterior of the matrix.

This invention also contemplates processes for the preparation of the novel particulate olfactory polymers. The processes broadly comprise incorporating an olfactory composition into a water-soluble polymer, incorporating the same or a different olfactory composition into a water-insoluble polymer, intermixing the two polymers under high shear to form the entity-containing matrix, and reducing the matrix containing the discrete entities into particles of the desired size.

The invention further provides a laundering composition having improved olfactory performance which comprises a detergent composition and a particulate olfactory polymer comprising a water-soluble normally solid polymer, a water-insoluble normally solid polymer, and at least one olfactory composition, a portion of the olfactory composition being incorporated in the water-soluble polymer and in the water-insoluble polymer, the water-soluble polymer and the water-insoluble polymer being physically associated with each other in such a manner that one is in the form of discrete entities in a matrix of the other. The particle size of the particulate olfactory polymers is controlled, as is the size of the discrete entities, to provide the desired properties for a particular end use, as described herein.

The invention is further described with respect to the accompanying drawings, wherein:

FIG. 1A is a cross-sectional view of a perfumed particle comprising olfactory composition-containing solid water-soluble polymer in interconnected pores of olfactory composition containing solid water-insoluble polymer matrix;

FIG. 1B is a cross-sectional view of the particle of FIG. 1A during immersion in water;

FIG. 1C is a cross-sectional view of the particle of FIG. 1A showing the water-insoluble polymer with interconnected pores, after dissolution of the water-soluble polymer;

FIG. 1D is a cross-sectional view of a particle with water-insoluble polymer in a water-soluble matrix;

FIG. 1E is a cross-sectional view of the particle of FIG. 1D immersed in water;

FIG 1F is a cross-sectional view of the particle shown in FIG. 1D immersed in water;

FIG. 2A is a schematic flow diagram representing a screw extruder during the compounding of water-soluble polymer with water-insoluble polymer while simultaneously adding perfumery material into the hollow portion of the barrel of the extruder;

FIG. 2B is a schematic flow diagram depicting a screw extruder during the compounding of a water-insoluble thermoplastic polymer with a water-soluble polymer while simultaneously adding perfumery material into the hollow portion of the barrel of the extruder;

FIG. 2C is a schematic flow diagram of a screw extruder during the compounding of water-soluble polymer, water-insoluble polymer and olfactory composition, with one of the resins containing one or more other additives;

FIG. 2D is a schematic flow diagram of a screw extruder during the compounding of water-soluble polymer, water-insoluble polymer and an oil, with one of the resins containing one or more other additives;

Figure 1G:
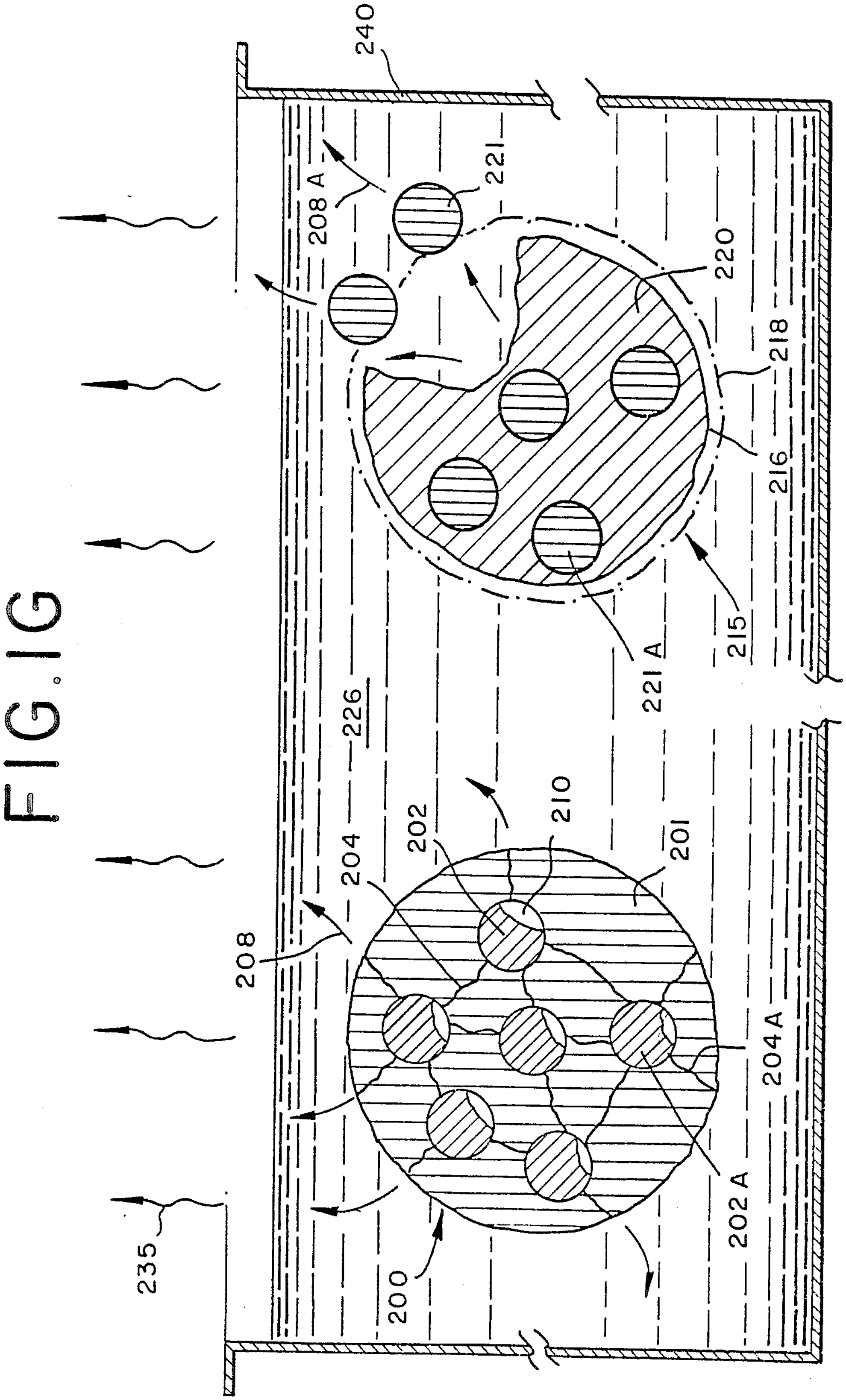
FIG. 1G is a cross-sectional view of both types of particles contemplated herein.

It will be understood from this description that the matrix or continuous phase of the perfumed particle can be water-soluble and the dispersed entities can be water-insoluble or the matrix can be water-insoluble and the dispersed entities can be water-soluble. In certain aspects of the invention, two types of particles can be produced for utilization in the same system; that is, one particulate olfactory polymer wherein the matrix is water-insoluble and the dispersed entities are water-soluble and another particulate olfactory polymer wherein the matrix is water-soluble and the dispersed entities are water-insoluble.

The weight ratio of water-soluble polymer to water-insoluble polymer can be varied from about 5:95 to about 95:5. In certain preferred embodiments, the ratio of water-soluble to waterinsoluble polymer is from about 20:80 to 80:20. Depending upon the ratio and the particular polymer or polymers used for the water-soluble polymer or for the water-insoluble polymer, the matrix will be one particular species and the dispersed entities will be the other particular species of polymers.

As taught herein, the olfactory composition-containing polymer according to the present invention is in particulate form. The size of the particles can readily be varied to provide the desired function of the particulate olfactory polymer. Thus, the relative quantities of water-soluble and water-insoluble polymers can be varied to obtain the desired effect. In the use of the particulate olfactory polymers, for instance in a detergent composition, a greater quantity of water-soluble dispersed entities will release a greater quantity of the olfactory composition and accordingly fragrance impression during the wash and rinse cycles.

It will be understood by those skilled in the art from the present disclosure, again alluding to compositions for various phases of a laundering operation, that the particle size and the relative ratio of water-soluble to water-insoluble polymer can be varied to release a lesser proportion of the olfactory composition during the wash cycle and a greater quantity during the rinse cycle. The quantity of olfactory composition released will depend upon the quantity of water-soluble material which dissolves during the wash cycle and that which dissolves during the rinse cycle.

The particle size in certain embodiments of the invention is an important attribute of the particulate olfactory polymer. In general, taking the instance of a matrix of water-insoluble polymer, the greater the quantity of water-soluble discrete entities, the larger the particle size can be to provide the desired release of olfactory composition. Particle sizes of 6000 micrometers and more can be used. In certain preferred embodiments, it is desirable at high levels of water-soluble discrete entities that the particle size not exceed about 3000 micrometers in average diameter. As the quantity of water-soluble discrete entities decreases, it is preferred that the overall particle size of the particulate olfactory polymer also be decreased. In general, in the practice of the invention with water-soluble discrete entities, the particle size can range from about 200 to about 1000 micrometers in average diameter.

When the water-soluble polymer is the matrix, the overall particle size of the particulate olfactory polymer again depends upon the use to be made of the particulate olfactory polymers, and can be varied widely. It has been found desirable that the particle size for particulate olfactory polymers with water-soluble polymer as the matrix be no larger than about 500 micrometers. In certain desired embodiments, the average diameter ranges from about 100 to 400 micrometers.

It will be understood from this description that the water-soluble polymer matrix can be formulated to dissolve more or less rapidly in an aqueous medium. Thus, such a particle can be formulated to dissolve relatively slowly, and thereby release olfactory composition relatively slowly, during the alkaline wash cycle, and then to dissolve more rapidly in the more pH-neutral rinse cycle.

The particulate olfactory polymer particles in certain aspects of this invention can also include a functional chemical. This functional chemical can itself be a polymer. Whether or not the functional chemical is a polymer, olfactory composition can also be contained in the functional chemical. As an instance of such use, the functional chemical can be a cationic polymeric composition carrying an olfactory composition which will be substantive on the textile. In this manner, the particulate olfactory polymers of this invention will be able to impart the fragrance to the textiles during and then beyond the drying cycle. It will be apparent that this will have the beneficial effect, in the laundry art, of conferring a desirably pleasant fragrance on the dried textiles. It is apparent that this is very advantageous in providing further benefits to the consumer by imparting a sense of freshness and cleanness to the garments by means of the fragrance.

The olfactory composition can also be included in the pores or interstices of the polymer matrix, as well as in the water-soluble and water-insoluble polymers. In other embodiments, the olfactory composition can be in the pores or interstices as well as in the water-soluble polymer, depending upon the nature of the constituents.

The water-soluble polymers which are used in certain desired embodiments include:

(i) a polymer resulting from the polymerization of
   (a) ethylene oxide and ethylene glycol; or
   (b) ethylene oxide, propylene oxide and ethylene glycol;
(ii) polyvinyl pyrrolidone;
(iii) water soluble cellulosics;
(iv) polyvinyl alcohol;
(v) polyvinyl methyl ether;
(vi) water soluble polyamides (including polyacrylamides, e.g., cationic and anionic polyacrylamides such as Reten® 210 and Reten® 220 manufactured by Hercules Inc., Wilmington, Del.);
(vii) water soluble polyurethanes;
(viii) polyethylene oxides; or
(ix) polymers of acrylic acid and/or methacrylic acid; and/or methyl acrylate and/or ethylacrylate and /or methyl methacrylate and/or ethyl methacrylate; or mixtures of two or more of the foregoing.

Thus, in certain embodiments, a polyethylene glycol having a weight average molecular weight of from about 4,000 up to about 20,000 can be utilized. Indeed, while polyethylene glycols are preferred in certain embodiments, other suitable water-soluble polymeric materials are the condensation products of $C_{10}$–$C_{20}$ alcohols or $C_8$–$C_{18}$ alkyl phenols with sufficient ethylene oxide, i.e., more than 50% by weight of the polymer, so that the resultant product (a) is soluble in water and (b) has a melting point of above about 35° C. Preferred polymers contain at least about 70% ethylene oxide by weight and more preferred polymers contain at least about 80% ethylene oxide by weight. Polymers based on the addition of ethylene oxide and propylene oxide to propylene glycol, ethylene diamine and trimethylol propane are commercially available under the names Pluronics®, Pluronic® R, Tetronics® and Pluradots® available from BASF Wyandotte Corporation, Wyandotte, Mich. Corresponding non-proprietary names of the first three tradename materials are Poloxamer, Meroxapol and Polyoxamine.

Examples of water-soluble hydroxyalkyl carboxalkyl celluloses include hydroxyethyl carboxymethyl cellulose, hydroxyethyl carboxyethyl cellulose, hydroxymethyl carboxymethyl cellulose, hydroxypropyl carboxymethyl cellulose, hydroxypropyl carboxyethyl cellulose, hydroxypropyl carboxypropyl cellulose, hydroxybutyl carboxymethyl cellulose, and the like. Also useful are alkali metal salts of these hydroxyalkyl carboxyalkyl celluloses, particularly and preferably the sodium and potassium derivatives.

Vinylpyrrolidone and methyl vinyl ether polymers can be used as water-soluble polymers in the practice of this invention, as can cationic acrylamide polymers, available from Hercules Corporation, Wilmington, Del., under the trade designations Reten® 210, 220, and 300.

The normally solid water-soluble organic polymer components of the invention should be immiscible with (that is, capable of forming a separate solid phase in ) the water-insoluble polymer components. This facilitates formation of a network of pores in the matrix of the particulate olfactory polymer.

The various water-soluble polymers shown in U.S. Pat. No. 4,018,729, such as cellulose ethers and quaternary nitrogen cellulose ehters, are useful in the practice of this invention.

The water-insoluble thermoplastic polymers which can be used in certain desired embodiments of the practice of the invention include:

(i) polyethylene;
(ii) polypropylene;
(iii) copolymers of ethylene and a higher alpha-olefin such as propylene of hexene-1;
(iv) poly(epsilon-caprolactone);
(v) polyvinyl chloride;
(vi) polyesters resulting from the polymerization of (a) maleic anhydride and/or phthalic anhydride and/or terephthalic acid and (b) ethylene glycol and/or propylene glycol and/or ethylene oxide and/or 1,2-propylene oxide;

(vii) copolymers of vinyl chloride and vinyl acetate;

(viii) copolymers of vinyl chloride and ethylene and /or propylene;

(ix) copolymers of vinyl acetate and ethylene and/or propylene and/or 2-butene and/or 2methyl-1-propene;

(x) thermoplastic polyurethanes derived from diisocyanates and polyols;

(xi) polyamides;

(xii) polyester polyamides; and (xiii) thermoplastic polyurethanes derived from diisocyanates and polyol polyesters.

Other water-insoluble polymers useful in the practice of the invention are those described in U.S. Pat. No. 4,618,629. For example, a polyurethane produced by reacting toluene-2,4-diisocyanate with a glycol adipate ester having a hydroxyl number of approximately 60 and a molecular weight of from about 2,000 up to about 2,500 in the presence of N-ethyl morpholine can be used in the practice of this invention.

Water-soluble polyamides shown in German Offenlegungschrift No. 3,615,514 can be used.

Examples of water-insoluble polyamides useful in practicing this invention are set forth in Japan Kokai No. 62/79808. Examples of water-insoluble polypropylene polymers useful in the present invention are in Japan Kokai No. 62/71502.

Examples of polyesters useful in the present invention, such as poly(ethylene terephthalate) and mixtures of polypropylene and poly(ethylene terephthalate), are shown in *Polymer Engineering Science,* 1987, Volume 27(9), pages 622–6. Polycarbonates and polycarbonate/acrylonitrile-butadiene-styrene blends which can be useful herein are set forth in *Polymer Engineering Science,* 1987, Volume 27(9), pages 632–9.

Useful thermoplastic polyurethane elastomers comprising polyester polyols (obtained from polyols, polyacids or anhydrides and epsilon-caprolactone) and polyisocyanates, the polyesterpolyols of which are composed of 0–90 mole percent polyesterpolyols (m.p. about 30° C., molecular weight, 1000–10,000) from polyhydric alcohols, 30–100% of which are $C_3$–$C_{10}$ branched diols, and 30–80% epsilon-caprolactone and 10–100 mole percent polyester polyols are shown in Japan Kokai No. 61/276814. Other water-insoluble polymers which can be used herein are thermoplastic polyurethane-type materials such as the thermoplastic polyester-polyurethane rubbers shown in Japan Kokai No. 62/53321.

Other water-insoluble polyamides useful in the practice of this invention are set out in U.S. Pat. No. 4,670,522.

Still other suitable water-insoluble thermoplastic polyurethane resins useful in the practice of this invention are mentioned in U.S. Pat. No. 4,676,975.

It is preferred in the practice of this invention to utilize a high-shear mixing device to disperse the separate entities of the one polymer through the matrix of the other polymer. In a batch process, a unit such as a Banbury mixer can be used. For continuous processing, it is preferred to use an extruder.

In practicing the process of this invention to form the particulate olfactory polymers, single screw or double screw extruders can be utilized. Some of the extruders that can be used are shown at pages 246–267 and 332–349 of the *Modern Plastics Encyclopedia,* 1982–1983.

More particularly, examples of extruders which are desirable for carrying out the process of the invention include:

1. The Krauss-Maffei twin screw extruder manufactured by the Krauss-Maffei Corporation/Extruder Division, 3629 West 30th St., Wichita, Kans. 67277;

2. The CRT ("Counter-Rotating Tangential") Twin Screw Extruder manufactured by Welding Engineers, Inc., King of Prussia, Pa. 19406;

3. The Leistritz Twin Screw Dispersion Compounder manufactured by the American Leistritz Extruder Corporation, 198 U.S. Route 206 South, Somerville, N.J. 08876;

4. The ZSK Twin Screw Co-Rotating Extruder manufactured by the Werner & Pfleiderer Corporation, 663 East Crescent Ave Ramsey, N.J. 07446;

5. The MPC/V Baker Perkins Twin Screw Extruder manufactured by the Baker Perkins Inc. Chemical Machinery Division, Saginaw, Mich. 48601;

6. The Berstorff twin screw or foam extrusion equipment manufactured by Berstorff Corporation, P.O. Box 240357, 8200-A Arrowridge Blvd., Charlotte, N.C. 28224.

FIG. 1A is a cross section of a perfumed particle comprising water-soluble polymer containing olfactory compositions in interconnected pores of a water-insoluble polymer matrix.

Particle 200, representative of one embodiment of the particulate olfactory polymers of this invention, comprises matrix 201 of water-insoluble polymers such as polyethylene or copolymers of ethylene and vinyl acetate. Water-soluble polymer entities 202 and 202A are generally contained in matrix 201 and they are interconnected by pores 204 and 204A containing the water-soluble polymer. Referring to FIGS. 1B and 1C, when particle 200 is immersed in water 206 in container 207, the water-soluble polymer located in pores 202 and 202A dissolves in water 206 as shown by arrows 208, and olfactory composition (not separately shown) coming from water-soluble polymer 202 as well as, if desired, from water-insoluble polymer 201, emanates from the surface of water 209 as shown by arrows 211. Of course, FIGS. 1A, 1B and 1C show the water-insoluble polymer being the matrix 201 and the water-soluble polymer being in the dispersed entities 202.

Conversely, the water-soluble polymer can be the matrix and the water-insoluble polymer can be the dispersed entities as shown in FIGS. 1D, 1E and 1F. In FIG. 1D particle 215 has water-soluble polymer 220 as the matrix and water-insoluble polymer 221 and 221A the dispersed entities. Edge 216 of particle 215 is shown. When particle 215 is immersed in water 226, shown in FIGS. 1E and 1F, water-soluble polymer 220 begins dissolving at surface 216 and loses a substantial amount of water-soluble polymer as shown by diminished edge 218. Meanwhile, the water-insoluble dispersed entity particles 221 leave polymer particle 215 and become independently immersed in water 226. Olfactory composition is released from water-soluble polymer 220 and, if desired, water-insoluble polymer 221, as indicated by arrows 228A and 228B. The olfactory composition ultimately leaves the surface 230 of water 226, as shown by arrows 231. Particles 221 and 221A are contained in vessel 227, as shown in FIGS. 1E and 1F.

Of course, both particles 200, having water-insoluble polymer 201 as the matrix and water-soluble polymer 202 as the dispersed entities, and particles 215, having water-soluble polymer 220 as the matrix and waterinsoluble polymer 221 as the separate entities, can be used simultaneously with the same or different olfactory compositions as shown in FIG. 1G.

Referring to FIG. 1G, polymeric particles 215, having as the matrix water-soluble polymer 220 containing water-insoluble dispersed entity polymers 221 and 221A, are immersed in water or other aqueous liquid 226, whereupon some olfactory composition leaves the liquid, as shown by arrow 228A, going into the ambient environment 235 above the system. Simultaneously, water-insoluble continuous phase polymer particles 200 having water-insoluble matrix 201, containing dispersed phase water-soluble polymer 202, partially dissolves, as shown by void 210. Water-soluble polymer 202 leaves the water-insoluble polymer matrix through pores 204 and proceeds into immersing water 226, as shown by arrows 208. Olfactory composition contained in water-soluble polymer 202 leaves the system into ambient environment above aqueous liquid 226, as shown by arrows 235, in container 240.

FIG. 2A is a schematic block flow diagram representing a screw extruder during the compounding of water-soluble resin with water-insoluble resin while simultaneously adding perfumery material into the hollow portion of the barrel of the extruder.

FIG. 2B is a variation of the apparatus of FIG. 2A in schematic block flow diagram form depicting a screw extruder during the compounding of a water-insoluble thermoplastic resin with a water-soluble resin while simultaneously adding olfactory composition into the hollow portion of the barrel of the extruder.

FIG. 2C is another variation of the apparatus of FIG. 2A showing in a block schematic flow diagram a screw extruder during the compounding of water-soluble resin, water-insoluble resin and olfactory composition, with one of the resins containing other additive(s).

FIG. 2D is a block schematic flow diagram of another variation of the apparatus of FIG. 2A showing a screw extruder during the compounding of water-soluble resin, water-insoluble resin and another oil which has a functional use, e.g., in perfumery, insect repellency, or the like and, further, with one of the resins containing other additive(s).

Thus, olfactory composition in tank 314 in apparatus 300 of FIG. 2A is fed into line 316 and thence into extruder 308 simultaneously with the feeding of water-insoluble polymer such as polyethylene from tank 302 through line 304 and line 306 into extruder 308; and water-soluble polymer from tank 310 through line 312 through line 306 into extruder 308. The extrudate is then cooled in cooling means 320 and, if desired, fed to particle size reducing means 324 through line 322.

In another embodiment, referring to FIG. 2B, olfactory agent from tank 340 is pumped through line 342 into extruder 338 simultaneously with the delivery to a hollow portion of extruder 338 further downstream of water-soluble polymer from tank 344 through line 346 into extruder 338. Upstream from the delivery point of the perfume into the extruder, water-insoluble polymer from tank 332 is fed through line 334 into extruder 338. The extruded strand passes through line 348 into cooling means 350 and, if desired, through line 352 to pelletizer 354 to produce pellets at 352.

In an alternative embodiment, referring to FIG. 2C, polymer which already contains perfume in container 374 is passed through line 376; olfactory composition from tank 370 is passed through line 372; and water-insoluble polymer from tank 362 is passed through line 364 simultaneously into extruder 368. The strands issue from extruder 368 at 378 into a cooling system 380 and pelletizer 384 to be subsequently recovered as pellets from line 386. The resin feed from vessel 362 is upstream from the feeding of the olfactory composition from vessel 370, which, in turn, is upstream from the feeding of the perfumed polymers from container 374.

In FIG. 2D, apparatus 390, water-insoluble polymer (which already contains perfume) from reservoir 392 is admixed in extruder 396 with additives from vessel 404. Simultaneously, Polyox® water-soluble polymer is passed from vessel 398 through line 402 into extruder 396 at a hollow portion thereof. Other desired additives, e.g., oil or solid or paste, such as a dog repellent located in vessel 404, are fed through line 406 into extruder 396. These other additives can include materials such as insect repellents, colorants, fabric softeners, anti-static agents, and the like. The extruded strands so formed are passed through line 408 into cooler 410 and pelletizer 412, and are then recovered as pellets at 414.

Generally, in certain preferred embodiments, double-screw extruders such as those aforesaid are used to mix the water-soluble and water-insoluble polymers, the olfactory composition or compositions, and any other polymers and additives. These extruders are well-known in the art.

Such extruders comprise an inner shaft member to which an outer screw member is affixed coaxially. In a double-screw machine, there are two shafts, each of which drives an outer screw member. The screws are intermeshed so that they subject the material being extruded to high-shear conditions, which contribute to dispersing the polymer or polymers destined to be the discrete entities in the polymer which will form the matrix in the particulate olfactory polymers of this invention.

These extruders also comprise an outer barrel member which encloses the screw or screws. Such extruders over their length can be fitted with different screws on the shaft and with different barrels surrounding the screws. Thus, over the length of the extruder various types and amounts of shear action can be used. The variation is carried out along the length of the extruder so that as various ingredients are initially introduced into the interior of the extruder, as the ingredients are initially mixed, and as the components become more highly mixed or dispersed, the mixing and shear action can be varied to obtain the particle size and amount of the polymer material to be the dispersed entities in the matrix.

After the extrusion, the extrudate is usually cooled. This can be accomplished by suitable means such as belts, blowers, liquids, and the like. The cooled extrudate comprises a matrix with dispersed entities. This extrudate is then comminuted to provide the finished particles by means known in the art.

In addition to the use of a single extruder, it will be apparent from this description that a series of extruders can be used to form extrudate. Thus, a functional composition with or without olfactory composition can also be added. It can be desirable not to mix this functional composition into the bulk as thoroughly as the dispersed entities are mixed. A functional composition is herein understood to mean a polymer or other material which will provide a desired function to the particles. Thus, a cationic polymer can be added to provide substantivity of the fragrance on dried textiles when the particulate olfactory polymers of this invention are used in laundering compositions.

The extrusion and subsequent comminution enable the facile control of the size of the dispersed entities and the overall size of the particulate olfactory polymers. This in turn provides control over the ultimate properties of the particulate olfactory polymers, as taught herein.

Figure 2E:
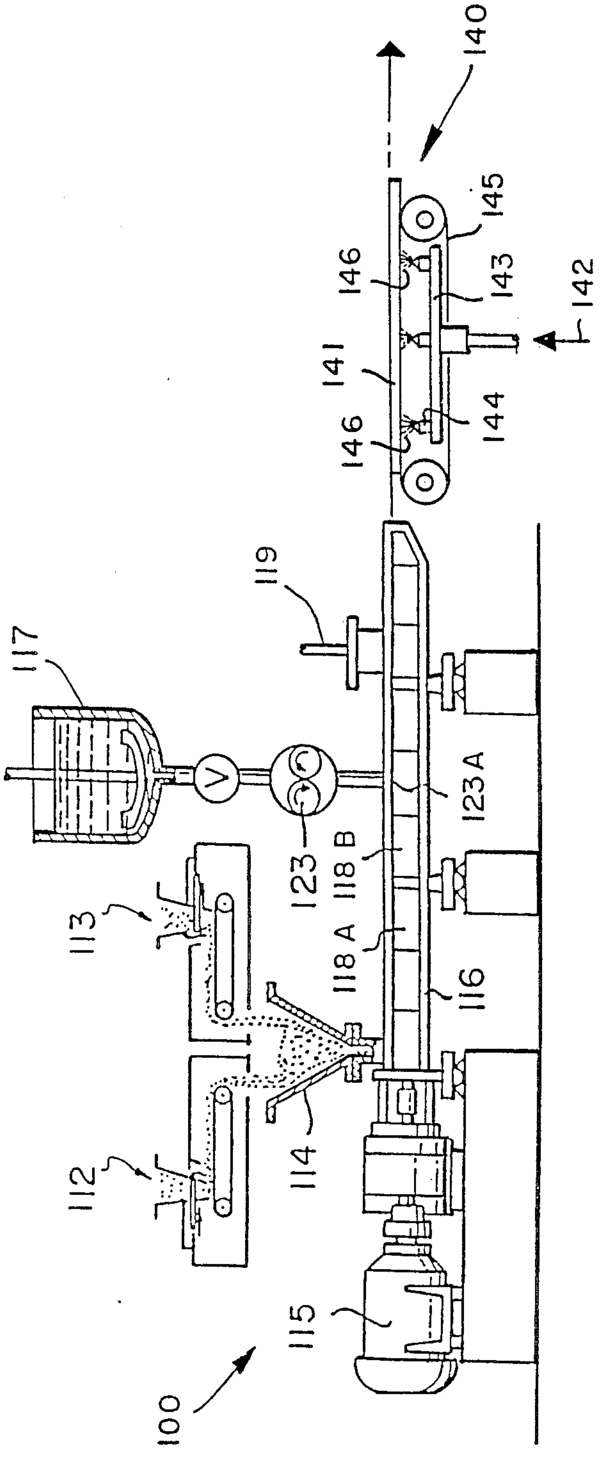
FIG. 2E is an elevation, partly in section, of an apparatus used for preparing particulate olfactory polymers according to the invention.

Apparatus suitable for use in the practice of this invention is shown in more detail in FIG. 2E.

FIG. 2E is an elevation, partly in section, of apparatus 100 showing the practice of a preferred aspect of the invention. It comprises screw extruder 118 for compounding of water-insoluble resin with water-soluble resin while simultaneously adding olfactory composition into the hollow portion of the barrel of the extruder and incorporates the pelletizing apparatus used in pelletizing the extruded product of the extrusion operation.

Motor 115 drives extruder screws 118 in barrel 116, the extruder being operated at temperatures in the range of about 150° to about 250° C. At the beginning of the barrel resin from hopper 112 (e.g., water-insoluble resin such as polyethylene) together with additives, such as opacifiers, processing aids, colors, cationic and/or nonionic fabric softeners, anti-static agents, pearlescent agents and densifiers, and water-soluble resin (e.g., Polyox®) from hopper 113, together with any desired additives, such as cationic or nonionic fabric softening or anti-static agents, is conducted via addition hopper 114 into extruder 102. Simultaneously, when the operation reaches "steady state", an olfactory composition, such as a perfume, is added to the extruder one, two or more of barrel segments 3-8 of the twin-screw extruder at locations 118*a*, 118*b*, 118*c* and 118*d* by means of gear pump 123 from tank 117. From line 119, optionally, gaseous or liquid blowing agents, e.g., nitrogen, carbon dioxide, and the like can be added simultaneously with the addition of the olfactory composition.

The feed rate range of the resin is about 80-300 pounds per hour. The feed rate range of the perfumant is between one and 70 percent of the feed rate range of the resin. If desired, the blowing agent rate range is such that the pressure of the gas or the pressure over the perfumant being fed into the extruder is between about 50 and about 1000 psig. Cooling means 140 comprises passing extrudate 141 onto belt 145 being cooled from the side opposite to that of the extrudate using water spray 146 coming from nozzles 144, from manifold 143 which, in turn, is fed by line 142.

One of the outstanding uses of the particulate olfactory polymers of the present invention is in particulate detergent compositions and washing systems. The detergent compositions and washing systems are normally solid. In other words, they are generally in the form of solid particles and are not liquids. In one embodiment of a method according to the invention, the particulate olfactory polymer is incorporated into a laundry dose system, that is, a pouch or envelope of nonwoven material which contains detergent and fabric softening ingredients. In another embodiment of the invention, the pouch can contain a detergent composition containing a bleach and a fabric softener.

In embodiments like the foregoing, the package of bleach, detergent composition, and softener is placed in the washing machine with the clothing to be cleaned and it remains with the clothes to the end of the dry cycle, at which time it is removed from the cleaned and dried clothing and discarded. In embodiments described herein, the olfactory agent is substantive on the clothes, and provides the dried clothing with a pleasant scent for a time following the dry cycle.

The detergent compositions with improved olfactory properties are prepared with ingredients which include those already well-known in the art. Generally, the detergent compositions contemplated herein are granular or particulate, as those produced by spray-drying. Such detergent compositions generally include a natural or synthetic surface active agent; a builder; and adjuvant ingredients to improve the washing or detergent properties, reduce corrosion, reduce pollution, improve the whiteness of the composition, improve the brightness of the textiles being washed, and/or to provide color and other desired appearance characteristics or improvements to the detergent composition.

Thus, detergent compositions involved by this invention can include anionic soap and non-soap surfactants, including alkali metal soaps and alkylammonium soaps of natural and/or synthetic higher fatty acids having from about eight to 24 carbon atoms, alkali metal salts of organic sulfuric reaction products having an alkyl radical containing from about eight to 22 carbon atoms, esterified fatty acid products, succinamates, anionic phosphate surfactants such as alkyl phosphate esters; nonionic synthetic detergents such as those produced by the condensation of alkylene oxide groups with an organic hydrophobic compound which can be aliphatic or alkyl aromatic, amine oxide derivatives, phosphine oxide derivatives, and sulfoxide derivatives; ampholytic synthetic detergents such as derivatives of aliphatic or aliphatic derivatives of heterocyclic secondary and tertiary amines with various sulfo, carboxy, sulfato, phosphato, or phosphono groups; and zwitterionic surfactants such as derivatives of aliphatic quaternary ammonium and phosphonium or tertiary sulfonium groups in which the cationic function can be in a heterocyclic ring and wherein a substituent contains a water-solubilizing group such as a carboxy, sulfo, sulfato, phosphato, or phosphono group, all as described in more detail in U.S. Pat. Nos. 3,664,961 and 4,180,485.

The so-called builders can be water-soluble inorganic builders such as carbonates, borates, phosphates, polyphosphates, bicarbonates, and silicates; organic builders such as alkaline sequestrant builder salts like amino carboxylates, nitriloacetates or carboxylates, phosphonates, citrates, or various organic acid salts well-known in the art. The detergent compositions can also contain coagglomerants and other materials some of which are briefly mentioned above to improve, change, or modify appearance and other cleaning and non-cleaning functions of the composition.

Other ingredients used in detergent compositions can of course be used in the particulate olfactory polymer-containing detergent compositions of the present invention. Thus, the compositions can contain bleaching agents, bleach activators, suds boosters or suds suppressors, anti-tarnish and anti-corrosion agents, soil-suspending agents, soil release agents, dyes, fillers, optical brighteners, germicides, pH adjusting agents, non-builder sources of alkali, hydrotropes, enzymes, stabilizing agents for enzymes, and the like.

In some embodiments of the invention, the detergent composition can contain a bleaching agent, for example, an oxidizing agent including percompounds such as a perborate or the like. It will be recognized that such bleaching agents can rapidly modify or destroy the olfactory composition or agent in the total detergent composition, and one of the outstanding attributes of the presently described invention is the ability to protect the olfactory agents from untoward effects of the other detergent composition ingredients, such as bleaches.

The fabric softeners are those conventionally utilized in the preparation of cleaning and washing agents. These softeners are generally cationic or nonionic products which impart softness effect. A review of fabric softener types and functionality is given in the three-part series "Fabric Softeners" by B. Milwidsky in *Household and Personal Products Industry,* September, October, and November 1987, Vol. 24, Nos. 9–11.

As taught above, the particulate olfactory polymers provided herein can be used in a pouch which contains detergent, detergent including bleaching agent, or detergent-containing fabric softener. In some aspects, the unitized dose detergent compositions can be used with non-woven sheets provided with pockets or protuberances. Some of these pouches in the sheet contain detergent, some can contain bleach, and some can contain softener. An advantage of the particulate olfactory polymers according to the present invention is that they can be placed in the unitized dose package, either with the several ingredients or in one or more of the pouches of woven sheets of multiple-action packages. The polymers act to protect the olfactory composition, such as a fragrance, from the untoward action of the bleach, whether the detergent be in a unitized dose or in a conventional box or carton.

Customarily, if a perfume is present in a detergent composition, it is totally released with the detergent in the wash cycle and its substantivity on cloth will depend, to a large extent, on its ability to withstand the actions and components of the complete laundry cycle. An outstanding feature of the particulate olfactory polymers according to the present invention is that the olfactory agent is not only protected from inimical components of the detergent compositions, but also the action of the olfactory agent is extended through the wash cycle, the rinse cycle, and the drying cycle. This is due to the unique combination of water-soluble and water-insoluble components of the particulate olfactory polymer and the physical combination of these two components in the particulate olfactory polymer.

As noted above, the particulate olfactory polymers of this invention have the capabilty in one embodiment of permitting the water-soluble polymer to dissolve and thereby release the olfactory agent. This then provides a pleasant scent during the wash cycle. By controlling the solubility of the water-soluble component of the particulate olfactory polymer, as by formulating it to be more or less soluble at various pH levels, some of the dissolution can take place during the rinse cycle as well. The dissolution of the water-soluble portion or component creates a greater pore volume. Indeed, when the water-soluble component comes out of the particulate olfactory polymer in the wash cycle, its solubility increases the exposed surface area of the residual polymer matrix and facilitates additional fragrance release in the dryer cycle. Thus, the olfactory composition provides a scent throughout the use of the detergent composition.

By balancing the perfume quantity, there will be some scent in the box and to the detergent composition itself, there will be a pleasant scent during the wash and rinse cycles, and there will be a pleasant scent during the drying, all achieved with a unitized dose form of the detergent composition containing the particulate olfactory polymer. Fragrance substantivity on the dried textiles can even be achieved through the use of a functional component, that is, fabric-softening or anti-static agent, contained in the particulate olfactory polymer. Moreover, throughout the laundering or cleaning cycle with the particulate olfactory polymer, the olfactory composition is protected from the deleterious effects of the various components of the unitized dose detergent composition and associated materials as taught above.

For use with detergent compositions, the relative quantity of the water-soluble polymer component desirably rages from ten to 85 percent of the total particulate olfactory polymer. If there is too little water-soluble component, there is insufficient permeability of the particulate olfactory polymer by the aqueous liquid, whereas if the water-soluble component comprises more than about 85 percent, the particulate olfactory polymer will usually disintegrate too rapidly during the wash and rinse cycles.

The particulate olfactory polymer of the present invention is of course capable of wider usage, as will be apparent to those skilled in the art from the present description. Thus, hair fragrance is put in material substantive on the hair to have the olfactory composition release later.

In order to achieve the precise action for a particular product, it is possible to put more or less olfactory composition in the water-soluble or the water-insoluble component of the particulate olfactory polymer. Thus, in certain embodiments of the invention, it is desirable to have from 20 to 80 percent of the total olfactory composition in the water-soluble component, and the remainder in the water-insoluble component.

It has been found that when there is less than 20 percent of the olfactory composition in the water-soluble component, not enough fragrance is released in the wash or rinse cycles of the laundry process to impart the desired pleasant aroma. Conversely, when there is more than 80 percent of the olfactory composition in the water-soluble component, there is too little of the olfactory composition remaining in the water-insoluble component for imparting a pleasant aroma in the drying cycle.

Generally, for purposes of the present invention, it has been found desirable to have the particulate olfactory polymers comprise from about 0.5 to about three percent of the detergent composition. At levels below this, it is difficult to create the intensity of desired aroma in the ambient space around the washer, and greater amounts than three percent tend to be too intense. In certain embodiments, it is preferred to have from one to two percent of the particulate olfactory polymer in a detergent composition.

The quantity of the olfactory composition in the total particulate olfactory polymer is desirably from about one to about 40 percent. In certain preferred embodiments, the quantity of olfactory composition is preferably from about 10 to about 30 percent of the particulate olfactory polymer. In certain preferred embodiments, 20 percent gives good results.

It will be understood from the present description that olfactory compositions can include perfumes and perfume compositions which generally impart a desirable aroma to articles and to the ambient atmosphere surrounding the articles. They can also include olfactory compositions such as pheromones, insect and animal attractants, and insect and animal repellants. In general, such olfactory materials are known and have been described in the art.

The properties of the polymers can also be selected for the particular end use to which the particulate olfactory polymers are to be put. Thus, for instance, the water-soluble polymer used can be one which is more or less soluble in alkaline solutions.

The olfactory composition is present in both the water-soluble and the water-insoluble polymers. It is incorporated in the polymers by mixing, and it will be understood that the olfactory composition can be dispersed, dissolved, or otherwise distributed in each polymer. This provides another tool in controlling the release of the olfactory composition during the use of the material.

All parts, percentages, proportions and ratios herein are by weight unless otherwise stated.

The following Examples are given to illustrate embodiments of the invention as it is presently preferred to practice it. It will be understood that these Examples are illustrative, and the invention is not to be considered as restricted thereto except as indicated in the appended claims.

In the following Examples, various terms are used to describe the materials. "LDPE" is low-density polyethylene, a water-insoluble polymer, with a density below 0.94, and more particularly a density of about 0.92. "EVA" is a copolymer of ethylene and vinyl acetate, a water-insoluble thermoplastic polymer. "POLYOX" is a trademark for a polyethylene oxide polyether made by the Specialty Chemicals & Plastics Division of Union Carbide Corporation, Danbury, Conn. and having the structure $$H-(O-CH_2CH_2)_n-O-CH_2CH_2-OH$$

wherein n is the degree of polymerization, and the molecular weight of the polymer ranges from about 100,000 to 5,000,000, depending on the viscosity grade of the resin. Polyox resins are water-soluble resins.

"PLURONIC" is a trademark for polyol polyethers marketed by BASF Corporation, Wyandotte, Mich., with the structure $$HO(CH_2CH_2O)_a(\underset{CH_3}{\underset{|}{C}}HCH_2O)_b(CH_2CH_2O)_c-H$$

and having a molecular weight ranging from about 4700 to about 14,000, with a, b, and c being integers from one to nine and (a+c)/b being from 2.5 to 6.0.

EXAMPLE I

A. Preparation of Particulate Olfactory Polymers

| | Composition (percent) | | |
|---|---|---|---|
| | A | B | C |
| Perfume oil | 20 | 20 | 20 |
| LDPE | 50 | 50 | 30 |
| Polyox WSR3154 | — | 30 | 50 |
| EVA | 30 | — | — |

In wide-mouth pint jars, 60 gram batches containing the appropriate amounts of the above components are mixed together. Then a Haake mixer is used to mix the components of each composition together in a melt. The mixtures are then removed from the Haake machine and allowed to cool. Using liquid nitrogen and a grinding mill set at 2 mm, the resins are ground cryogenically. Size separation is carried out by sieving the compositions through US Standard sieves #18, #45 and #70, and each fraction is collected and labeled.

B. Volatile Levels of Initial Particulate Polymers

The volatile level of each composition is determined by weighing (to the nearest 0.0001 g) 1-2 grams of each resin (in duplicate) into an aluminum weighing dish and drying the samples in a vacuum oven at 180° C. for 18 hours. Table I lists the percent of volatiles of each particulate polymer (−18, +45 mesh) prepared in A, with volatility assumed to be due solely to the fragrance oil (20% oil content).

TABLE I

PERCENT VOLATILES OF COMPOSITIONS A, B, C

| SAMPLE | | VOLATILES |
|---|---|---|
| POLYMER A (1) | | 18.35% |
| POLYMER A (2) | | 18.29% |
| | AVERAGE | 18.32% |
| POLYMER B (1) | | 17.69% |
| POLYMER B (2) | | 17.48% |
| | AVERAGE | 17.58% |
| POLYMER C (1) | | 18.42% |
| POLYMER C (2) | | 18.38% |
| | AVERAGE | 18.41% |

C. Laundry Use

1. Preparation of Detergent Packet

Using a non-woven sheet formed into a pouch, 30 g of non-fragranced detergent is mixed with 1.5 grams of particulate olfactory polymer (−18, +45 mesh) and added into the pouch, which is then sealed to prevent loss of particles. Three pouches are prepared for each of Compositions A, B, and C.

2. Laundry Evaluation a. Wash cycle: Five cotton towels and five cotton wash cloths are placed in a conventional household top-loading washing machine and washed with a unitized packet containing one of particulate olfactory Compositions A, B, or C. Each packet and respective component contained in the pouch is weighed to 0.0001 g prior to introduction into the washing machine. The water level is set at low (30 liters) and the wash cycle to 10 minutes using hot water (55° C.). The packet and fabric are removed after the wash/spin cycle and placed in the dryer for a 40-minute drying cycle.

b. Rinse cycle: The same procedure as in 2*a* is repeated, except the packet is removed from the machine upon completion of the total hot wash/warm rinse cycle (rinse for 5 minutes at 35° C.). Again the packet is placed into the dryer for a 40-minute drying cycle with the cloth.

c. Dryer cycle: Another test is run in which the laundry load is subjected to the wash/rinse cycle and a pouch containing only 1.5 grams of polymer is added solely to the dryer cycle. Weight loss in this test is due strictly to volatilization of the fragrance composition from the polymer.

3. Weight Loss from the Laundry Cycle a. Upon completion of the drying cycle, each packet is reweighed for residual solid level. Residual fragrance levels and fragrance release levels in the corresponding laundry process are readily calculated based on the weight loss.

TABLE II

| | FRAGRANCE RELEASE IN THE LAUNDRY CYCLE | | | |
|---|---|---|---|---|
| | INITIAL WT (g) | RESIDUAL WT (g) | % SOLIDS REMAINING | % VOLATILES LOST* |
| POLYMER A (W) | 1.5007 | 1.3810 | 92.0 | 39.9 |
| POLYMER A (R) | 1.5094 | 1.3849 | 91.8 | 41.2 |
| POLYMER A (D) | 1.5034 | 1.4508 | 96.5 | 18.4 |
| POLYMER B (W) | 1.5080 | 0.8432 | 55.9 | 90.9 |
| POLYMER B (R) | 1.5143 | 0.8439 | 55.7 | 91.3 |
| POLYMER B (D) | 1.5208 | 1.4682 | 96.5 | 19.7 |
| POLYMER C (W) | 1.5243 | 0.8063 | 52.9 | 67.9 |
| POLYMER C (R) | 1.5579 | 0.5315 | 34.1 | 94.9 |
| POLYMER C (D) | 1.5563 | 1.5154 | 97.4 | 14.3 |

(W) = Wash cycle/dry cycle
(R) = Wash cycle/rinse cycle/dry cycle
(D) = Dry cycle only
*% Volatiles Lost = percent loss of volatiles and/or solubles.

It will be understood that in the wash or wash/rinse cycle tests, weight loss can be due to Polyox solubility and/or fragrance release. Therefore the percentage volatiles lost is the ratio (×100) of the total weight loss to the fraction of polymer that is water soluble and volatile.

In the dry cycle test, the percentage of volatiles lost is the ratio of weight loss to the fraction of polymer that is volatile (perfume oil content from Table I).

b. Determination of percent volatiles remaining in each polymer upon completion of the laundry process:

All solids recovered from the packet are subjected to vacuum drying at 150° C. for 18 hours. In this test, the remaining volatiles are driven off from the polymer resins and indicate the level of fragrance release in the particular laundry process. The percent volatiles remaining is the percent remaining in the recovered polymer. The percent fragrance released is the percent of fragrance or volatiles released into the appropriate laundry process, that is, 100 percent less the remaining volatiles in the particulate olfactory polymer recovered from the pouch.

TABLE III

| FRAGRANCE REMAINING IN POLYMER AS DETERMINED FROM VACUUM OVEN WEIGHT LOSS | | | |
|---|---|---|---|
| SAMPLE | % VOLATILES REMAINING | % FRAGRANCE RELEASE | % POLYMER RELEASE |
| POLYMER A (W) | 62.9 | 37.1 | — |
| POLYMER A (R) | 63.4 | 36.6 | — |
| POLYMER A (D) | 82.2 | 17.8 | — |
| POLYMER B (W) | 16.5 | 83.5 | 95.1 |
| POLYMER B (R) | 16.1 | 83.9 | 95.5 |
| POLYMER B (D) | 84.5 | 15.5 | 2.5 |
| POLYMER C (W) | 38.9 | 61.1 | 70.3 |
| POLYMER C (R) | 13.9 | 86.1 | 98.1 |
| POLYMER C (D) | 87.3 | 12.7 | 0.6 |

It will be appreciated from the foregoing that the addition of Polyox to water-insoluble polymer has a tremendous impact on fragrance release in the laundry process. As indicated by the data in Table III, only 36 to 37 percent of the fragrance is released from the water-insoluble portion of the particulate olfactory polymer A (LDPE/EVA) when subjected to a wash/dry or a wash/rinse/dry cycle. Replacing the 30 percent EVA with 30 percent water-soluble polymer (Polymer B) results in an 83 to 84 percent fragrance release, with the amount released in the wash/dry cycle being the same as the wash/rinse/dry cycle.

In particulate olfactory polymer B, it appears that all the water-soluble polymer dissolves in the wash cycle since a further rinse does not alter fragrance release or Polyox dissolution. However, changing the ratio of LDPE/Polyox/perfume from 50:30:20 (particulate olfactory polymer B) to 30:50:20 (particulate olfactory polymer C) does alter polymer solubility in the wash and wash/rinse cycles as well as the release of fragrance.

As further shown in the data for particulate olfactory polymer C in Table III, 70 percent of the polymer is dissolved in the wash cycle with 61 percent of the fragrance released in the wash/dry cycle. Subjecting the same particulate olfactory polymer to a wash and rinse cycle increases polymer solution to 95 percent and correspondingly increases fragrance release in the wash /rinse/dry cycle to 86 percent. Thus, the effectiveness of the particulate olfactory polymer to release fragrance in a laundry process is significantly influenced by not only the substitution of a water-soluble polymer for water-insoluble polymer in the matrix, but also by the ratio of water-soluble to water-insoluble polymer in the matrix.

EXAMPLE II

Particulate polymer compositions are prepared with a high-shear Banbury mixer system according to the following formulas:

| | Composition (parts by weight) | | |
|---|---|---|---|
| Ingredient | A | B | C |
| Perfume oil | 20 | 20 | 20 |
| LDPE | 50 | 60 | 20 |
| EA | 30 | — | — |
| POLYOX WSR-3154 | — | 20 | 60 |

The particulate olfactory polymer compositions of this Example are prepared in the manner taught in Example I and a powder having a nominal particle size of 250 microns is collected for each sample.

The particulate olfactory polymers are then admixed with an unperfumed heavy duty built granular detergent composition at a weight ratio of particulate olfactory polymer to detergent of 1:50. The resulting detergent with olfactory polymer particles is placed in a non-woven pouch of the type used in Example I. The packets are made up to contain sufficient detergent so that the concentration of the detergent powder is 0.1 weight percent in a Launder-O-Meter washing machine.

The detergent packets are used in the Launder-O-Meter to wash textile fabrics according to a specified method for 40 minutes with hot (54° C.) water. After the washing is completed, the packets are recovered and the remaining powder is dried in a dessicator for 72 hours. This powder is then examined with a scanning electron microscope, and the micrographs so obtained are shown in FIGS. 3–8.

Figure 3:
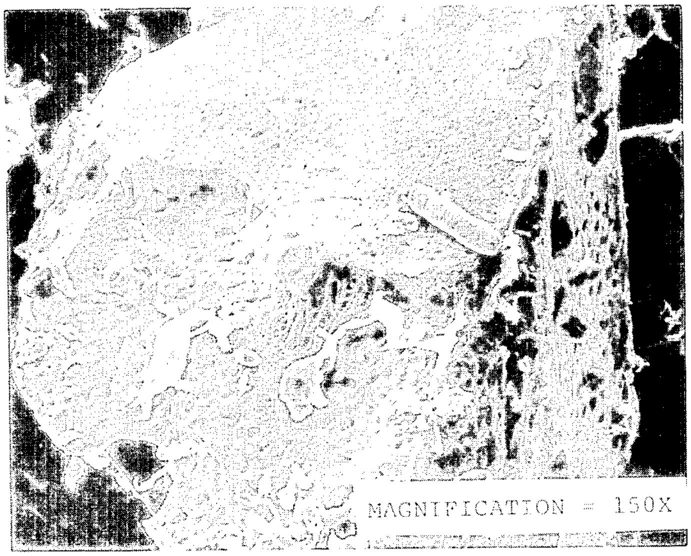
FIG. 3 is a photomicrograph (100× magnification) of a portion of a particulate polymer for comparison.

FIG. 3 is a scanning electron photomicrograph (100× magnification) of a portion of particulate olfactory polymer D containing all water-insoluble polymer (LDPE/EVA) in its original form prior to exposure to the Launder-O-Meter process.

Figure 4:
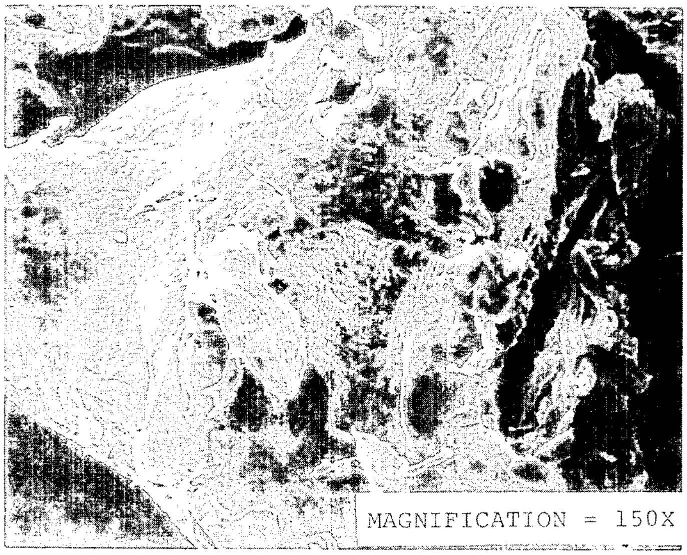
FIG. 4 is a photomicrograph of the particle of FIG. 3 after washing with water.

FIG. 4 is a scanning electron photomicrograph of particulate olfactory polymer D as in FIG. 3 after the Launder-O-Meter wash cycle.

Figure 5:
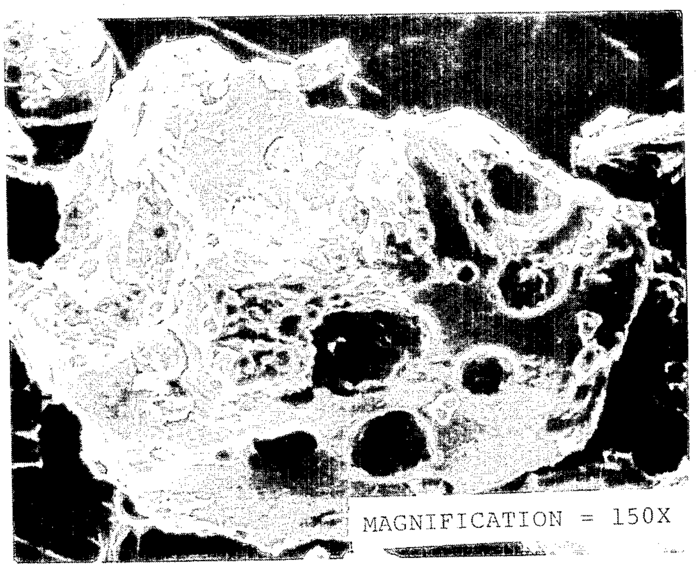
FIG. 5 is a photomicrograph of a cross section of a particulate olfactory polymer according to the invention.

FIG. 5 is a scanning electron photomicrograph of particulate olfactory polymer E of the invention containing 60% water-insoluble polymer (LDPE) and 20% water-soluble polymer (Polyox) in its original form prior to exposure to the Launder-O-Meter process.

Figure 6:
FIG. 6 is a photomicrograph of the particle of FIG. 5 after washing.

FIG. 6 is a scanning electron photomicrograph of particulate olfactory polymer E as in FIG. 5 after the Launder-O-Meter wash cycle.

Figure 7:
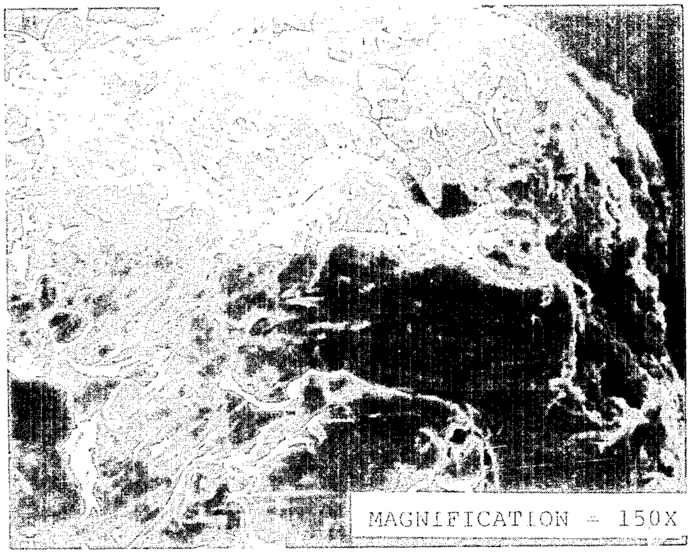
FIG. 7 is a photomicrograph of a particulate olfactory polymer according to the invention.

FIG. 7 is a scanning electron photomicrograph of particulate olfactory polymer F of the invention containing 20% water-insoluble polymer (LDPE) and 60% water-soluble polymer (Polyox) in its original form prior to exposure to the Launder-O-Meter process.

Figure 8:
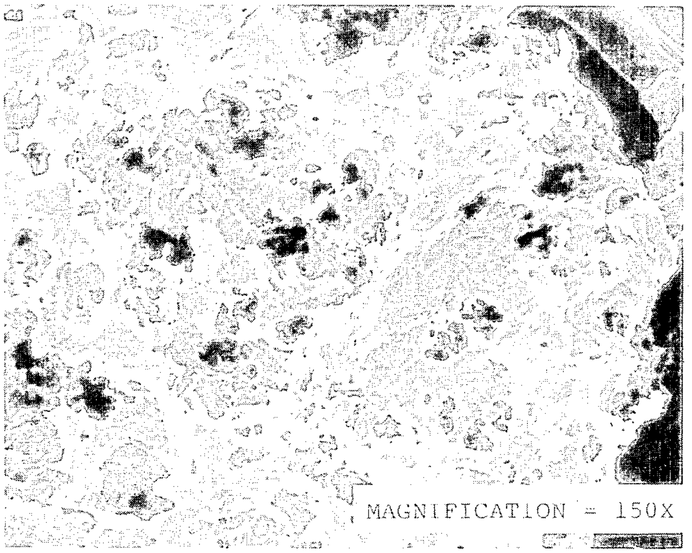
FIG. 8 is a photomicrograph of the particle of FIG. 7 after washing.

FIG. 8 is a scanning electron photomicrograph of olfactory polymer F as in FIG. 7 after the Launder-O-Meter wash cycle.

The scanning electron micrographs of olfactory polymers D, E and F recovered after washing compared to the same olfactory polymers in their original state show that although substantially no structural change occurs in the water-insoluble polymer matrix (polymer D, FIGS. 3 and 4), particulate olfactory polymers E and F of this invention containing the water-soluble polymer (Polyox) do indeed change, showing much more porosity after the water wash than before (FIGS. 5 and 6 and FIGS. 7 and 8). This further illustrates, as did Example I, that the water-soluble polymer component of the particulate matrix dissolves out, leaving behind the water-insoluble (LDPE) skeleton as shown in FIGS. 1A, 1B and 1C.

While the foregoing description relates to pouches made from nonwoven fabrics, it will be apparent from this disclosure that the pouches or envelopes for the particulate olfactory polymer can be made of a variety of materials, such as synthetic or natural woven textiles, plastic film and formed plastic containers having various of the detergent and/or bleaching and/or fabric-softening and/or antistatic ingredients in different portions of the container. The envelope, pouch, or other container is closed so as to retain therein any solid particles of the particulate olfactory polymer, or of products therefrom. In any event, the container for the particles permits the ingress and egress of liquids so that the soluble components of the composition can be released from the interior of the container.

The particulate olfactory polymer particles can also contain other functional materials as set forth above. These functional materials can comprise separate entities. When extrusion is used to prepare the particulate olfactory polymers according to this invention, the functional chemical can even be used as a core partially or entirely surrounded by the matrix.

The size of the discrete entities herein can be varied over a range which will depend upon the use of the particulate olfactory polymer, the specific water-soluble and water-insoluble polymers used, the intended rate of release of the olfactory composition, the nature of the use environment of the particulate olfactory polymer, and the like. The size of the discrete entities in the practice of this invention is smaller than the effective diameter of the particulate olfactory polymer, and it has been found desirable in some embodiments of the invention that the sizes of the discrete entities be from about 50 to about 1000 micrometers.

It will be understood that the particulate olfactory polymers of this invention can be used with a variety of olfactory compositions. An olfactory composition is one containing a perfume or other ingredient which acts through the atmosphere to provide a physiological or sensory effect as generally described herein. The olfactory composition can also contain various solid or liquid vehicles, preservatives, coloring agents and other adjuvants which augment or protect the ingredients.

The particulate olfactory polymers of the present invention have been most particularly described for use in laundering compositions, but from this disclosure it will be apparent to those skilled in the art that the particulate olfactory polymers are susceptible of a wide variety of uses to provide for the controlled release of olfactory compositions. Thus, the particulate olfactory polymers can be used in other detergent and cleaning compositons such as dishwasher detergents and shampoos, hair conditioning and other cosmetic and personal care compositions, in agricultural products for the release of olfactory materials such as pheromones, in other cleaning or household compositions such as toilet bowl deodorizers which are placed in the water reservoir, as well as in numerous other products which benefit from the controlled release of olfactory compositions.

It will be understood from the foregoing that for uses such as toilet bowl deodorizers, larger particle sizes can be prepared to effect a gradual release of the olfactory composition. Thus, particle sizes up to about 50 mm can be used. Of course, in this instance, the water-soluble polymer will be prepared to form a network thereof in the water-insoluble matrix.

What is claimed is:

1. A composition for laundering textiles which composition has improved olfactory performance and which comprises a detergent composition and a particulate fragrance-bearing polymer comprising a water-soluble normally solid polymer, a water-insoluble normally solid polymer, and at least one perfume composition, a portion of the perfume composition being incorporated in the water-soluble polymer and a portion being incorporated in the water-insoluble polymer, the water-soluble polymer and the water-insoluble polymer being physically associated with each other in such a manner that one is in the form of discrete entities in a matrix of the other, the matrix substantially comprising the surface of the particle.

2. A laundering composition according to claim 1 wherein the perfume composition comprises from about one to about 40 percent of the particulate olfactory polymer.

3. A laundering composition according to claim 1 wherein the water-soluble polymer portion of the particulate fragrance-bearing polymer is from about five to about 95 percent of the polymer portion of the particulate fragrance-bearing polymer, the water-insoluble polymer is from about 95 to about five percent of the polymer portion of the particulate fragrance-bearing polymer, and the perfume composition is from about one to about 40 percent of the composition.

4. A laundering composition according to claim 1 wherein the water-soluble polymer constitutes the matrix and the water-insoluble polymer is dispersed in the matrix.

5. A laundering composition according to claim 1 wherein the water-insoluble polymer constitutes the matrix and the water-soluble polymer is dispersed in the matrix.

6. A laundering composition according to claim 1 wherein the water-soluble polymer is (i) a polymer resulting from the polymerization of
 (a) ethylene oxide, and ethylene glycol; or
 (b) ethylene oxide, propylene oxide and ethylene glycol;
(ii) polyvinyl pyrollidone;
(iii) water soluble cellulosics;
(iv) polyvinyl alcohol;
(v) polyvinyl methyl ether;
(vi) water soluble polyamides;
(vii) water soluble polyurethanes;
(viii) polyethylene oxides; or
(ix) polymers of acrylic acid and/or methacrylic acid; and/or methyl acrylate and/or ethylacrylate and /or methyl methacrylate and/or ethyl methacrylate;

or a mixture of two or more of the foregoing polymers.

7. A laundering composition according to claim 1 wherein the water-insoluble polymer is (i) polyethylene;
(ii) polypropylene;
(iii) copolymers of ethylene and propylene;
(iv) poly(epsilon-caprolactone);
(v) polyvinyl chloride;
(vi) polyesters resulting from the polymerization of (a) maleic anhydride and/or phthalic anhydride and/or terephthalic acid and (b) ethylene glycol and/or propylene glycol and/or ethylene oxide and/or 1,2-propylene oxide;
(vii) copolymers of vinyl chloride and vinyl acetate;
(viii) copolymers of vinyl chloride and ethylene and /or propylene;
(ix) copolymers of vinyl acetate and ethylene and/or propylene and/or 2-butene and/or 2-methyl-1-propene;
(x) thermoplastic polyurethanes derived from diisocyanates and polyols;
(xi) polyamides;
(xii) polyester polyamides; and
(xiii) thermoplastic polyurethanes derived from diisocyanates and polyol polyesters.

or a mixture of two or more of the foregoing polymers.

8. A laundering composition according to claim 1 wherein the perfume composition in the water-soluble polymer and in the water-insoluble polymer is the same.

9. A laundering composition according to claim 1 wherein the perfume composition in the water-soluble polymer is different from that in the water-insoluble polymer.

10. An article for use in laundering clothing and other textiles which comprises a substantially water-insoluble envelope or pouch containing the laundering composition according to claim 1, the envelope or pouch being closed so as to retain any solid particles therein and the envelope or pouch having walls permitting the ingress and egress of aqueous liquids so that the water-soluble components of the laundering composition can be released from the interior of the envelope or pouch.

11. A method for laundering clothing and other textiles which comprises physically associating the article of claim 9 with the clothing or textiles to be laundered and then washing, rinsing and drying the clothing or textiles.

12. A particulate fragrance-bearing polymer comprising a water-soluble normally solid polymer, a water-insoluble normally solid polymer, and at least one perfume composition, a portion of the perfume composition being incorporated in the water-soluble polymer and a portion being incorporated in the water-insoluble polymer, the water-soluble polymer and the water-insoluble polymer being physically associated with each other in such a manner that one is in the form of discrete entities in a matrix of the other, the matrix substantially comprising the surface of the particle.

13. A particulate fragrance-bearing polymer according to claim 12 wherein the particle size of the particulate olfactory polymer is less than about 3000 micrometers.

14. A particulate fragrance-bearing polymer according to claim 12 wherein the particle size of the particulate olfactory polymer is from about 100 to about 3000 micrometers.

15. A particulate fragrance-bearing polymer according to claim 12 wherein the particle size of the particulate olfactory polymer is from about 200 to about 1000 micrometers.

16. A particulate fragrance-bearing polymer according to claim 12 wherein the size of the discrete entities is smaller than the size of the particulate olfactory polymer and is from about 50 to 1000 micrometers.

17. A particulate fragrance-bearing polymer according to claim 12 wherein the matrix is water-insoluble polymer, and a proportion of the water-soluble discrete entities in each particle communicate with each other and at least some of the entities communicate with the surface of the particle.

18. A process for the preparation of the particulate fragrance-bearing polymer of claim 12 which comprises incorporating a perfume composition into a water-soluble polymer, incorporating an olfactory composition into a water-insoluble polymer, intermixing the water-soluble polymer and the water-insoluble polymer under high-shear to provide discrete entities of one polymer in a matrix of the other polymer.

19. A process according to claim 18 wherein the high shear is provided by a twin-screw extruder.

* * * * *

UNITED STATES PATENT AND TRADEMARK OFFICE

CERTIFICATE OF CORRECTION

PATENT NO. : 4,842,761

DATED : June 27, 1989

INVENTOR(S) : HOWARD J. RUTHERFORD

It is certified that error appears in the above-identified patent and that said Letters Patent is hereby corrected as shown below:

Abstract, line 8, correct the spelling of "entities".

Column 2, line 63, change "watersoluble" to --water-soluble--.

Column 4, line 38, change "waterinsoluble" to --water-insoluble-- .

Column 6, line 55, correct the spelling of "ethers".

Column 18, line 48, change "EA" in Table to --EVA--.

Column 20, line 63, after "polymer" insert --in the polymer--.

Column 22, line 53, change "an olfactory" to --a perfume--.

Signed and Sealed this

Seventeenth Day of April, 1990

*Attest:*

HARRY F. MANBECK, JR.

*Attesting Officer* *Commissioner of Patents and Trademarks*